Jan. 21, 1969     T. R. KELLEY     3,422,637
ELASTOMER DRIVE UNIT
Filed Nov. 22, 1966     Sheet 1 of 2

INVENTOR
Theron R. Kelley

BY Robillard + Byrne
ATTORNEYS

Jan. 21, 1969     T. R. KELLEY     3,422,637
ELASTOMER DRIVE UNIT
Filed Nov. 22, 1966     Sheet 2 of 2
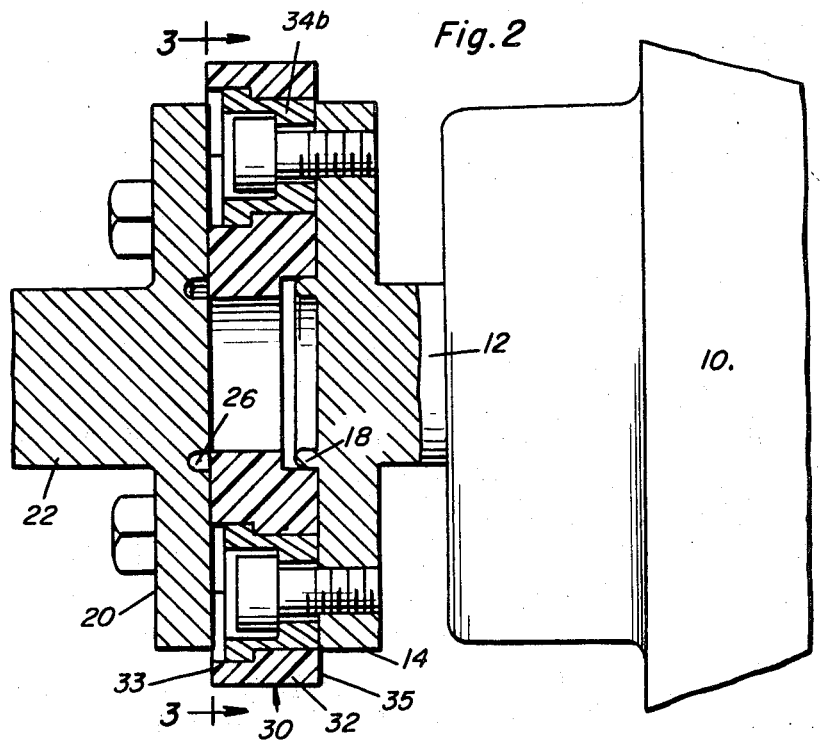
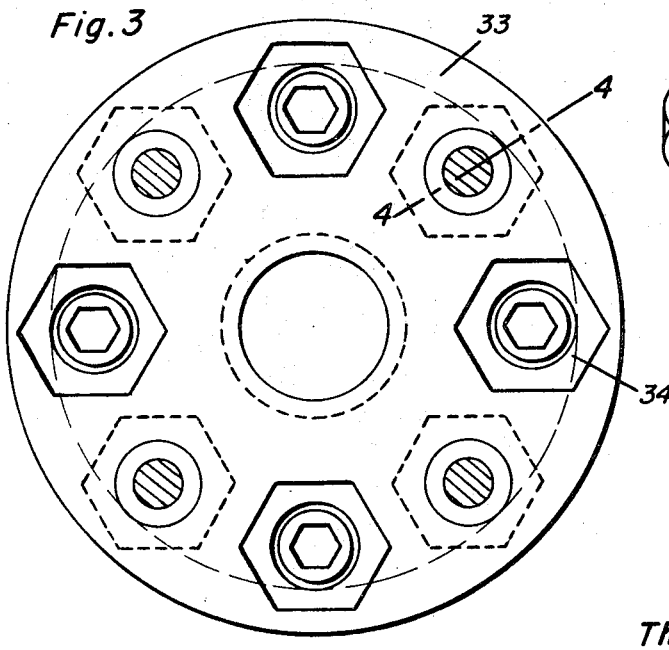
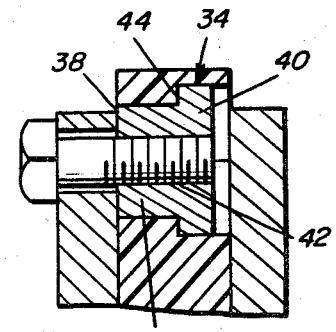
INVENTOR
Theron R. Kelley
BY Robillard & Byrne
ATTORNEYS

United States Patent Office 3,422,637
Patented Jan. 21, 1969

3,422,637
ELASTOMER DRIVE UNIT
Theron R. Kelley, Mattapoisett, Mass., assignor to Tedan Inc., West Hanover, Mass., a corporation of Massachusetts
Continuation-in-part of application Ser. No. 508,325, Nov. 17, 1965. This application Nov. 22, 1966, Ser. No. 596,287
U.S. Cl. 64—13  3 Claims
Int. Cl. F16d *3/78*

ABSTRACT OF THE DISCLOSURE

A drive member comprising an annular disc of plastic elastic material having at least four rigid connectors secured in the disc, each connector alternately having an outer end flush with one face of the disc, each connector having a bolt receiving opening therethrough and its wall thickness sufficient to withstand the same shearing force as the size of the bolt receivable therein.

---

The invention herein relates to an elastomeric drive unit, particularly intended for use as a drive connection between opposed flanges, as for example, propeller shaft assemblies, and is especially advantageous where high speed is involved, which speed normally carries with it substantial vibration. This application is a continuation-in-part of application Ser. No. 508,325 filed Nov. 17, 1965, now abandoned.

It is recognized that the utilization of an elastomeric disc positioned between opposing flanges of a driving and driven member is old in the art. So far as applicant can determine, the teaching in both the published and practical art was to compress the disc between the flanges whereby the flanges and disc became a unitary drive. In structures wherein the bolts extended only through the disc and one flange, the bolts were primarily used to position the disc or the flange, or both, and were provided with co-operating driving surfaces in addition to compressing the flanges.

It is obvious that compression of the disc reduces its absorption capabilities and if there be misalignment which is corrected by greater compression at one connection than at another, the elastomeric characteristics of the dics vary accordingly.

The present invention departs from the teaching of the prior art in that the disc is not compressed between the flanges, in that it is a unitary device having fixed therein a plurality of metal connector inserts, which are locked to the faces of the flanges by the securing bolts whereby the resultant drive is from one flange to the connectors, locked thereon, from these connectors to the disc, through the disc to the opposite connectors, and from the opposite connectors to the second flange.

If there be misalignment, the elastomeric material moves relative to the connector inserts with distribution of the change throughout the disc without a build-up of compression forces at one point.

Additionally, upon a reversal of the drive, the connectors include means temporarily producing compression forces over a wide area of the disc, these means being positioned within the disc and relatively remote from the face thereof with the resultant force acting in an axial direction against a substantial cushion material.

The object of the invention is to provide a drive unit of the above described type having the advantages set forth and which in effect has substantially all the advantages of a fluid drive incorporated into a relatively simple plastic-elastic unitary drive unit.

Figure 1:
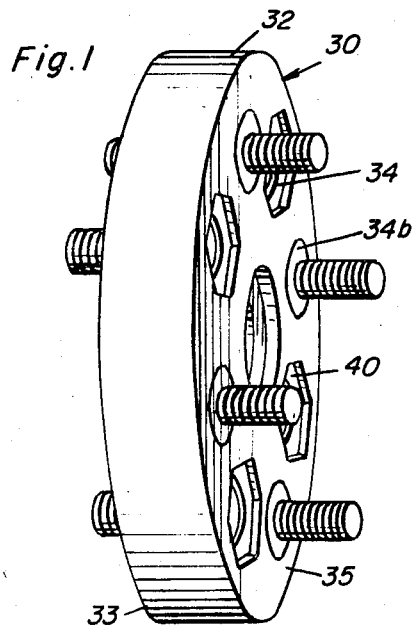
Figure 5:
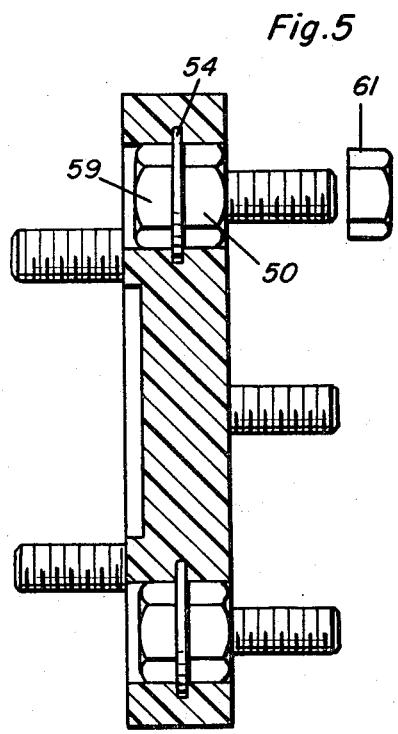
Figure 6:
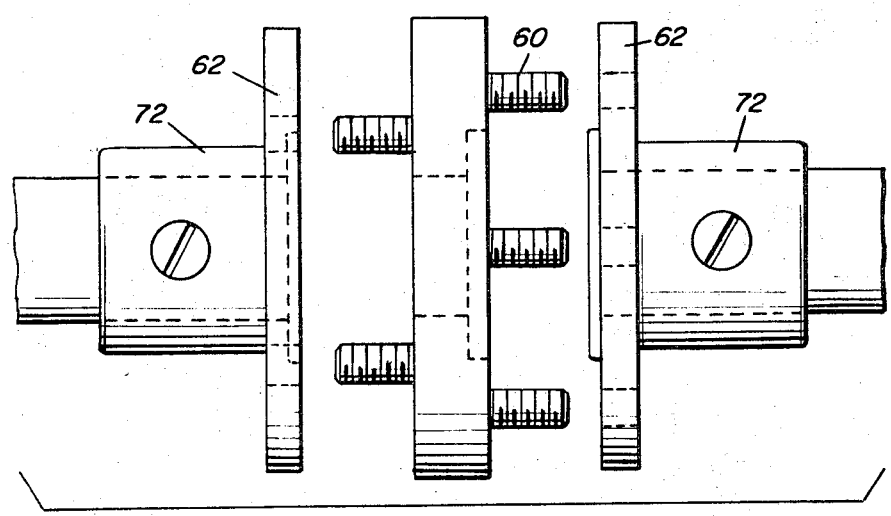

The foregoing and other objects and advantages will be seen from a description of the invention when read in conjunction with the accompanying drawings wherein:

FIGURE 1 is a perspective view of the drive unit;
FIGURE 2 is a side view partly in section showing the drive unit between the driving flange on the end of a powered shaft and a driven flange;
FIGURE 3 is a view taken on the line 3—3 of FIGURE 2;
FIGURE 4 is a sectional view taken on the line 4—4 of FIGURE 3;
FIGURE 5 is a sectional view of a modified form of the unit; and
FIGURE 6 is a view illustrative of coupling members with which the unit of FIGURE 5 may readily be used.

Referring to the drawings and more particularly to FIGURES 1 through 4, there is shown one end of an engine assembly 10 having a coupling flange 14 integral with the power shaft 12. The outer face 16 of flange 12 is flat except for an annular pilot 18. Facing the flange 14 is a flange 20 on the inner end of a propeller or driven shaft 22. The face 24 of flange 20 is flat, except for a pilot-receiving recess 26. The described flanges are typical of those now in use, and they are usually connected face to face with the pilot 18 of flange 12 in the recess of flange 20.

In accordance with the invention herein, the unit 30 is positioned between the respective flanges and is so constructed that modification of the standard flanges is not required.

In the preferred embodiment of FIGURES 1 through 4, the drive connector 30 comprises an annular disc 32 having parallel outer faces 33 and 35. Face 35 of the disc also has a boss 37 therein for freely receiving the pilot 18 of flange 14. The disc is of elastomeric material, here being polyurethane having a durometer reading of from 92 to 94 on the A scale. Molded within the disc 30 to become unitary therewith are a plurality of rigid connectors 34 (see FIGURE 4), numbering eight in the embodiment shown, the number depending on the size of the unit, there always being an even number, not less than four. Each metal connector 34 has an annular body portion 36 having a flat lower end 38, and secured to the other end is a flange 40 having a larger external periphery than the body portion 34. The connector 34 is further provided with an axially aligned bolt-receiving opening 42 therethrough. The minimum wall thickness of the connectors 34 must be sufficient to withstand the same shearing force as the bolt receivable therein and thus the bottom faces 38 have a substantial cross-sectional area which becomes a bearing surface against the coupling flange. The dimension of the insert from top to bottom (axially) should be such that the shoulder or bottom face 44 of flange 40 is positioned parallel to a plane through the disc approximately mid-way between and parallel to the opposite faces thereof, and preferably with the shoulders slightly beyond the plane toward the disc face of the flange end of the insert faces.

The metal connectors 34 are positioned in the disc 32 with the center of the bolt openings therethrough on the same bolt circle as that of the flanges to which they are to be connected, and spaced to correspond to the flange bolt openings. Additionally, each alternate connector has its bottom face 38 parallel and flush with one face of the disc.

With the connectors so constructed, when the unit is secured between the flanges 14 and 20, the bottom face 38 of each insert bears and is locked against the face of the coupling flange and, as the distance from the connector face 38 to the connector flange shoulder 44 is fixed, the disc 32 cannot be placed under compression by the tightening of the securing studs or bolts.

In the installation shown in FIGURES 2, 3 and 4, the clearance between the engine assembly 10 and flange 14 is rather limited and the insertion of a bolt from the engine side may not be possible. For this reason, the metal connectors 34b on one side of the disc, adjacent flange 14, herein, are recessed to receive the head of a connecting stud and the bolt openings in flange 14 are threaded to secure the stud, the head being provided with a socket to permit tightening with a socket wrench. The bolt opening in connector 34b provides minimum clearance and it may or may not be threaded, depending on the size of drive. It is apparent that bolts may be used when clearance is sufficient or enough to insert a wrench to hold a nut, although not sufficient to work the wrench, or other impediment prevents the working of the wrench. The bolt installation is also shown in FIGURE 2, though one or the other would normally be used throughout. Likewise, if the threads of the bolt holes of the coupling are badly worn, as occurs in older installations, the bolt would be used to assure proper securing. In such instances, the bolt head may be provided with a socket if the take-up must be from that end of the bolt. Standard bolts and cap screws may be used. The opposite connectors 34 have a threaded bolt or cap screw opening and the bolt openings in flange 20 generally are not threaded. It should also be noted that the wall of connector 34b is reduced in size adjacent the bolt head, and it must have the minimum thickness at this point heretofore explained.

In order to completely embed the connectors and provide sufficient strength in the disc to prevent shearing, the outside diameter thereof is longer than the diameter of the coupling flanges. The diameter of the disc should exceed that of the coupling flange by from 15 to 20% for the lowest horsepower output for the size of engine with which it is to be used. As horsepower for the same size engines but of different makes vary, a preferred figure is 25 to 30%. As seen in FIGURE 3, a circle transcribed on a radius equal to the bolt circle plus the connector wall thickness, which shall be called the connector outer circle has a diameter approximately equal to that of the coupling flanges. Therefore the outside diameter of the disc should be from 15 to 30% longer than the connector outer circle diameter.

From the foregoing, it is seen that when the connectors are secured the smaller end 38 of each, which shall be considered the bearing face, locks against the coupling flange and is rigidly secured against it. At most there is only frictional engagement between the adjacent faces of the disc and coupling flange faces. If there be any misalignment of the shafts, the disc material will move relative to the connectors flexing from the center outwardly. In the preferred embodiment, the disc is an annular ring whereby the flexing action is improved. It is also apparent that the transfer of torque from flange 12 is to the connectors 34b, thence to the elastomeric material of the disc to the connectors 34 and to flange 20, rather than through an elastomeric member compressed between the coupling flanges.

Upon reversal, the flange 20 will pull away from flange 14 whereupon the connector flange shoulders will establish compression forces acting over the total combined area of the shoulders and through at least half the thickness of the disc which cushions them.

Drive units in operation have reduced vibration by fifty percent in most instances; and as much as seventy percent in some instances. This result seems to be attributable to the fact that the elastomeric material retains its fluidity as it is not under compression. Where space is not a premium, connectors 34 may be used throughout.

Referring to the embodiment shown in FIGURES 5 and 6, the elastomeric disc is similar to that shown in FIGURES 1, 2 and 3. This embodiment has the advantage of being inexpensive to manufacture, but the disadvantage of requiring the coupling flanges to be widely separated for installation purposes. The connectors herein comprise a nut 50 having a wall thickness which will stand the same shearing force as the bolt. Aligned with the nut 50 is a washer 54, the washer 54 being secured between the nut 50 and the bolt head 56 of a bolt 60. The washer has a larger outer radius than nut 50 to provide a compression absorbing shoulder. As in the first embodiment, the connector is embedded in the disc combining the two into a unit, with the lower face of the nut 50 flush with the face of the disc and constituting the bearing surface.

This type of drive unit finds use in types of installation wherein there are coupling flanges 62 (FIGURE 6) having a collar 72 removably secured and slidable on a stub shaft 74 as is often found on electric motors. The bolts 60 will extend through openings in the flanges and be secured by nuts 61. The functioning and result is the same as in the first embodiment.

Although the invention has been described as preferably using polyurethane having a durometer reading of approximately 92 to 94 on the A scale, other elastomeric materials may be used. Obviously, if the durometer reading is reduced, the unit will not wear as long, and the size of the disc increased to prevent shearing, and an increase will reduce its ability to absorb vibrations and thrust.

Summarizing, it is seen that a drive unit is disclosed which is a unitary structure consisting of an annular disc of elastomeric material and a plurality of rigid connectors fixedly secured therein to thereby provide a unitary structure, the connectors are preferably of less length than the width of the disc and are annularly and axially disposed so that each succeeding or alternate connector has an outer end flush with one face of the disc. At the inner end of each connector, a radially extending flange is carried to provide a shoulder spaced from the outer end, preferably at or slightly beyond half the width of the disc whereby a compression cushion is provided to absorb thrust. Each connector has an axially aligned bolt receiving opening therethrough, and the wall thickness of the connector is at least sufficient to withstand the same shearing force as the size of the bolt receivable in the bolt opening.

It is recognized that many changes could be made and still obtain a drive unit of the type described wherein the torque is transmitted from one connector to another through the disc, where the disc is not normally under compression and including means for absorbing the thrust when the unit is placed under compression due to reversing the drive; and still come within the scope of the appended claims.

The following is claimed:

1. A drive unit for transmitting drive between opposed connecting flanges including,
   (a) a drive member comprising an annular disc solely of plastic elastic material having opposed parallel faces,
   (b) an even number of rigid connectors, not less than four, axially secured in said disc and annularly spaced an equal distance apart,
   (c) each connector alternately having its outer end flush with one face of the disc,
   (d) a bolt opening provided axially of each connector for receiving a bolt for connection to an opposed connecting flange,
   (e) and the wall thickness of each connector being sufficient to withstand the same shearing force as the size of bolt receivable in the opening, said connector so constructed that the disc cannot be placed under compression by the tightening of the securing bolts.

2. The drive unit defined in claim 1 wherein the radius of the bolt circle plus the connector wall thickness is equal to and the radius of the disc is 15 to 30% greater than the radius of said coupling flanges.

3. A drive unit including,
   (a) an annular disc of elastomeric material having opposed parallel faces, (b) an even number of rigid connectors, not less than four, axially secured in said disc and annularly spaced an equal distance apart,
(c) each connector alternately having its outer end flush with one face of the disc,
(d) a bolt opening provided axially of each connector,
(e) and the wall thickness of each connector being sufficient to withstand the same shearing force as the size of bolt receivable in the opening, and wherein the inner end of each connector is provided with a radially extending flange providing a shoulder facing the opposite end and
(f) wherein each connector has a body portion comprising a nut having one end flush with a face of the disc, the flange at the outer end of the nut comprising, a washer having a larger outside radius than the nut, and a bolt extending through the washer and secured in the nut with the bolt head securing the washer against the nut and the bolt stem extending beyond the face of the disc.

References Cited

UNITED STATES PATENTS

| | | | |
|---|---|---|---|
| 1,615,138 | 1/1927 | Runyon | 64—13 |
| 1,842,582 | 1/1932 | Bulley | 64—13 |
| 2,271,568 | 2/1942 | Olson | 64—11 |
| 2,945,365 | 7/1960 | Ulderup et al. | 64—11 |

FOREIGN PATENTS 972,708   8/1950   France.

HALL C. COE, *Primary Examiner.*